(12) United States Patent
Seiz et al.

(10) Patent No.: US 12,196,222 B2
(45) Date of Patent: Jan. 14, 2025

(54) GUARD FOR AN INTAKE CHANNEL OR BLOW CHANNEL OF A POWER TOOL AND POWER TOOL WITH SUCH A GUARD

(71) Applicant: Andreas Stihl AG & Co. KG, Waiblingen (DE)

(72) Inventors: Jonathan Seiz, Stuttgart (DE); Sebastian Junker, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 549 days.

(21) Appl. No.: 17/592,614

(22) Filed: Feb. 4, 2022

(65) Prior Publication Data
US 2022/0260087 A1    Aug. 18, 2022

(30) Foreign Application Priority Data
Feb. 12, 2021    (EP) .................................... 21156954

(51) Int. Cl.
| | |
|---|---|
| *F04D 29/44* | (2006.01) |
| *F16L 55/02* | (2006.01) |
| *A01G 20/47* | (2018.01) |
| *B65G 53/06* | (2006.01) |
| *B65G 53/24* | (2006.01) |
| *B65G 53/50* | (2006.01) |
| *F04D 17/16* | (2006.01) |
| *F04D 25/06* | (2006.01) |

(Continued)

(52) U.S. Cl.
CPC ............ *F04D 29/441* (2013.01); *F16L 55/02* (2013.01); *A01G 20/47* (2018.02); *B65G 53/06* (2013.01); *B65G 53/24* (2013.01); *B65G 53/50* (2013.01); *B65G 2201/04* (2013.01); *F04D 17/16* (2013.01); *F04D 25/0673* (2013.01); *F04D 29/667* (2013.01); *F04D 29/703* (2013.01)

(58) Field of Classification Search
CPC .... F04D 29/441; F04D 17/16; F04D 25/0673; F04D 29/667; F04D 29/703; F16L 55/02; A01G 20/47; B65G 53/50; B65G 53/06; B65G 53/24; B65G 2201/04
USPC .................................. 137/377; 15/312.1, 326
See application file for complete search history.

(56) References Cited

U.S. PATENT DOCUMENTS

| | | | | |
|---|---|---|---|---|
| 1,949,074 | A | * | 2/1934 | Gunn ........................ F01N 1/08 181/249 |
| 3,215,172 | A | * | 11/1965 | Ardoin ...................... F02K 1/36 239/289 |

(Continued)

FOREIGN PATENT DOCUMENTS

DE    10 2019 101 077    7/2019

*Primary Examiner* — Minh Q Le
(74) *Attorney, Agent, or Firm* — Gudrun E. Huckett

(57) ABSTRACT

A guard for an intake channel or blow channel of a power tool has a first rib with a longitudinal direction, wherein the first rib has a first rib section that extends along the longitudinal direction of the first rib from a first end to a second end of the first rib section. The first rib section has an inherent frequency. One or more first disruptive bodies are arranged on the first rib section between the first end and the second end of the first rib section. The first disruptive bodies are configured to translatorily vibrate together with the first rib section. The first rib section and the one or more first disruptive bodies form a vibration system with a system inherent frequency, wherein the inherent frequency of the first rib section is different from the system inherent frequency.

27 Claims, 5 Drawing Sheets

(51) Int. Cl.
  *F04D 29/66* (2006.01)
  *F04D 29/70* (2006.01)

(56) References Cited

U.S. PATENT DOCUMENTS

| | | | | |
|---|---|---|---|---|
| 3,996,025 | A * | 12/1976 | Gulden | B01J 8/048 |
| | | | | 48/107 |
| 4,884,314 | A | 12/1989 | Miner et al. | |
| 11,523,569 | B2 * | 12/2022 | Greene | A01G 20/47 |
| 2012/0096672 | A1 | 4/2012 | Hatano et al. | |
| 2018/0163750 | A1 | 6/2018 | Landen et al. | |
| 2018/0291930 | A1 * | 10/2018 | Pellenc | F04D 29/542 |
| 2019/0242405 | A1 * | 8/2019 | Holt | F04D 29/524 |
| 2020/0221651 | A1 | 7/2020 | Klingler et al. | |
| 2021/0033115 | A1 | 2/2021 | Hoffman et al. | |
| 2021/0164495 | A1 * | 6/2021 | Loercher | F04D 29/667 |
| 2021/0225347 | A1 * | 7/2021 | Hoffman | F04D 25/084 |
| 2022/0213903 | A1 * | 7/2022 | Sakuragi | F04D 25/084 |
| 2022/0408662 | A1 * | 12/2022 | Takano | F04D 25/06 |
| 2023/0296102 | A1 * | 9/2023 | Herrera | F04D 25/0673 |
| | | | | 417/411 |
| 2024/0023498 | A1 * | 1/2024 | Ji | E01H 1/0809 |

\* cited by examiner

GUARD FOR AN INTAKE CHANNEL OR BLOW CHANNEL OF A POWER TOOL AND POWER TOOL WITH SUCH A GUARD

BACKGROUND OF THE INVENTION

The invention relates to a guard for an intake channel or blow channel of a power tool, wherein the guard comprises at least one rib with a longitudinal direction, wherein the at least one rib comprises at least one rib section, wherein the rib section extends along the longitudinal direction of the rib from a first end to a second end and, considered by itself, comprises an inherent frequency.

The invention moreover relates to a power tool provided with such a guard.

Hand-guided power tools, in particular blowers or vacuum shredders, are known that serve for blowing away or for sucking in and shredding plant debris such as leaves and trimmings etc. Such power tools comprise a blower device that serves for producing an air flow. The air flow flows through an intake opening at the housing into the blower device and exits through a blow opening.

At the openings, grid-like guards are provided so that ingress into the corresponding openings and accidental contact with movable or hot drive parts or motor parts are prevented. In operation of such power tools, increased noise levels can be generated that are extremely disturbing for the operator.

SUMMARY OF THE INVENTION

Therefore, the object of the invention resides in further developing a guard for an intake channel or blow channel of a power tool of the aforementioned kind in such a way that the operation of the power tool is enabled at a minimal noise level.

In accordance with the invention, the object is solved for a guard of the aforementioned kind in that at the rib section, between the first end and the second end, a disruptive body is arranged that is configured to translatorily vibrate together with the rib section and in that the rib section and the disruptive body form of vibration system with a system inherent frequency, wherein the system inherent frequency and the inherent frequency of the rib section are different.

A further object of the invention resides in further developing a power tool of the aforementioned kind in such a way that the operation of the power tool is enabled at a minimal noise level.

In accordance with the invention, this object is solved for a power tool of the aforementioned kind in that the power tool comprises a guard according to the invention.

The invention is based on the recognition that the noise emissions that are generated in operation of the power tool of the prior art at least partially are caused by the guard grids that are provided at the power tool. When air flows through the grid, the grid is separately excited and caused to vibrate by the air flow. When the excitation frequency caused by the flow corresponds to an inherent frequency of the excited grid structure, resonance is present. The resonance vibration generates a noise emission that is perceived by the operator as extremely disturbing.

The guard according to the invention for an intake channel or blow channel of a power tool comprises at least one rib with a longitudinal direction. The at least one rib comprises at least one rib section, wherein the rib section extends from a first end to a second end along the longitudinal direction of the rib and, considered by itself, comprises an inherent frequency. At the rib section, between the first end and the second end, a disruptive body is arranged that can vibrate translatorily together with the rib section. A disruptive body that can translatorily vibrate is to be understood as a disruptive body that can vibrate at least translatorily. It is also possible that the disruptive body that can vibrate translatorily can additionally vibrate also rotatorily. The rib section and the disruptive body together form a vibration system with a system inherent frequency. The system inherent frequency and the inherent frequency of the rib section are different.

The disruptive body effects an inherent frequency shift. When the inherent frequency of the rib section is still within a resonance range, the arrangement of the disruptive body on the rib section forms a vibration system whose inherent frequency is outside of the excitation frequency and thus outside of the resonance range. The vibrations of the rib section with disruptive body are reduced so that also the noise emissions are reduced.

It is advantageously provided that the guard is designed as a guard grid and comprises at least one additional rib wherein the additional rib and the at least one rib intersect at a connection point. The connection point forms for the adjoining rib sections a suspension point that is fixed translatorily. Therefore, the connection point cannot swing translatorily. The additional rib is preferably oriented transversely to, in particular orthogonally to the at least one rib. In this way, a particularly stiff rib arrangement is provided.

It is preferably provided that due to the connection point the at least one rib is divided into a first rib section and into a second rib section and the additional rib into a top rib section and a bottom rib section. Preferably, at least one disruptive body is provided, respectively, on two, preferably three, in particular four, rib sections of the guard. In this way, four vibration systems are produced whose system inherent frequency is different, respectively, compared to the respective inherent frequency of the rib section. The rib sections of a rib comprise preferably a different number of disruptive bodies, respectively. The connection point is not translatorily movable per se. The connection point however can optionally vibrate rotatorily. Thus, two neighboring rib sections can influence each other indeed through the connection point in regard to their vibration behavior. On the other hand, when the rib sections comprise a different number of disruptive bodies, the different vibration systems are also different with respect to each other in their inherent frequency. In this way, neighboring vibration systems act on each other in a vibration-reducing manner.

Preferably, the disruptive bodies have masses of different magnitude. Thus, the mass of the vibration system can be changed by the number of disruptive bodies on a rib section or by the mass of individual disruptive bodies. Thus, the inherent frequencies in particular of neighboring vibration systems can be manipulated in such a way that the vibrations of the vibration systems at least reduce each other or cancel each other.

It is advantageously provided that the disruptive bodies of two rib sections of one rib, in relation to a plane that is oriented orthogonally to the rib and that intersects the connection point, are arranged asymmetrically to each other. When changing the inherent frequency of a vibration system, the position of the disruptive body on the respective rib sections is also important. The rib sections vibrate depending on the excitation frequency in different modes. In this context, the basic vibration of a rib section corresponds to the first harmonic. The rib section can however also vibrate in the second harmonic, third harmonic etc. Depending on the vibration form, the position of the disruptive body on the rib section is of great importance. When two rib sections exhibit the same vibration, the inherent frequency of the respective vibration system changes already by a different positioning of a disruptive body on the rib section. Due to the provided asymmetric arrangement of the disruptive bodies relative to each other, different inherent frequencies of the vibration systems are produced and a joined vibration of the rib sections with each other is prevented.

Preferably, the rib comprises a top side and a bottom side oppositely positioned to the top side, wherein preferably a disruptive body of one rib section of a rib is arranged on the top side and a disruptive body of the other rib section is arranged on the bottom side on the same rib. Due to the arrangement of two disruptive bodies on different sides of a rib, the center of mass of the respective vibration system is changed. In this way, the corresponding vibration systems have different vibration properties.

The mass of the disruptive body corresponds preferably to at least 2%, in particular at least 5%, preferably approximately 8%, of the mass of the rib. The higher the mass of the disruptive body, the greater the influence of the disruptive body on the inherent frequency of the vibration system comprised of disruptive body and rib section.

The disruptive body is preferably arranged in such a way on the rib section that, in a viewing direction perpendicularly onto the top side of the rib, the disruptive body is arranged within the rib. In an alternative embodiment, it can also be expedient to arrange the disruptive body such on the rib section that it projects past the rib.

The disruptive body extends in a length direction, wherein the longitudinal ends of the disruptive body are advantageously rounded aerodynamically. In this way, the resistance in relation to the air flow is reduced.

The rib and the at least one disruptive body are advantageously embodied as one piece. The one-piece configuration provides for a simple manufacture of the guard. The rib and the disruptive body are comprised preferably of the same material, in particular of plastic material. Preferably, rib and disruptive body are produced in the form of an injection-molded part.

Further features of the invention result from the drawing in which an embodiment of the invention is illustrated which will be described in detail in the following.

DESCRIPTION OF PREFERRED EMBODIMENTS

Figure 1:
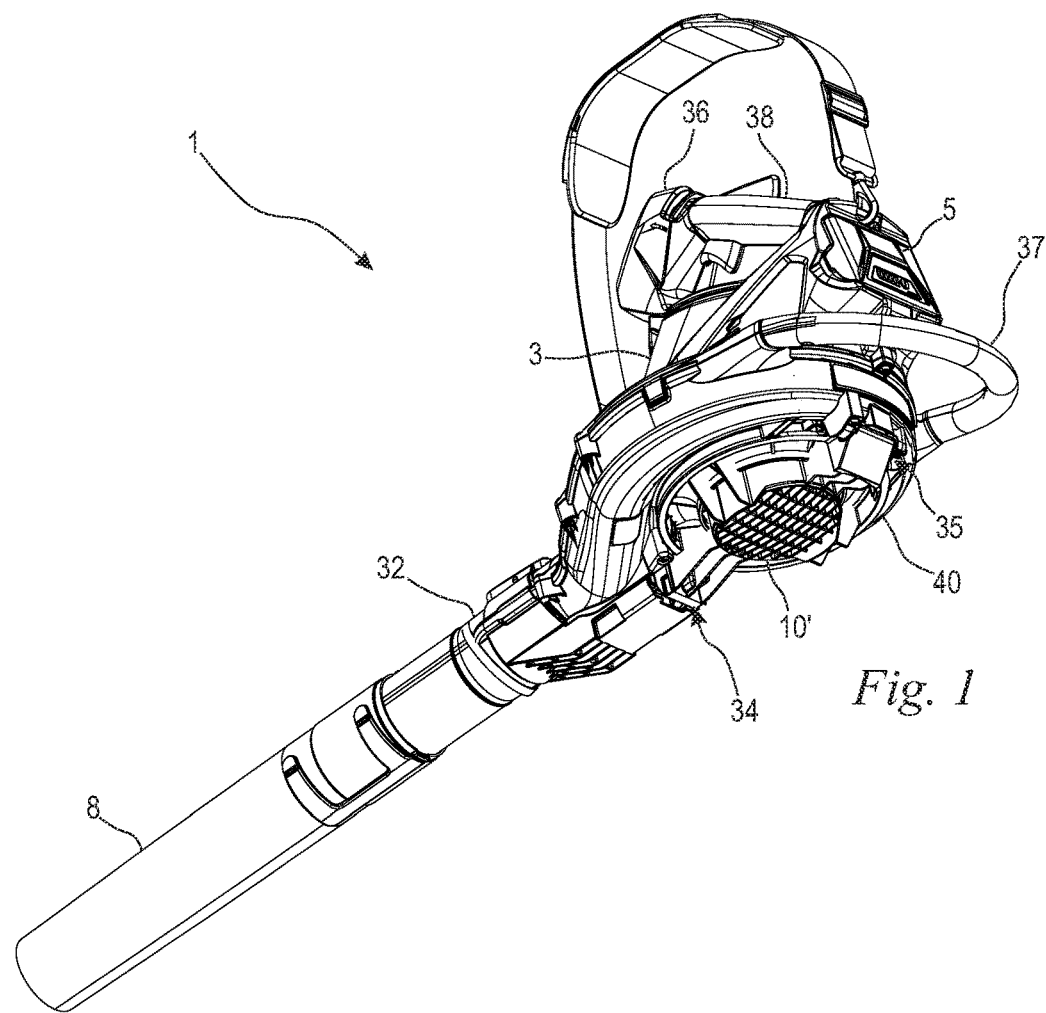
FIG. 1 is a perspective illustration of a hand-guided power tool according to the invention with a guard grid at the intake opening.

FIG. 1 shows in perspective illustration a power tool 1. The power tool 1 in the embodiment is designed as a vacuum/blower device. Accordingly, the power tool 1 can be operated in a vacuum mode as well as in a blower mode. Vacuum mode and blower mode are different operating modes of the power tool 1.

Figure 2:
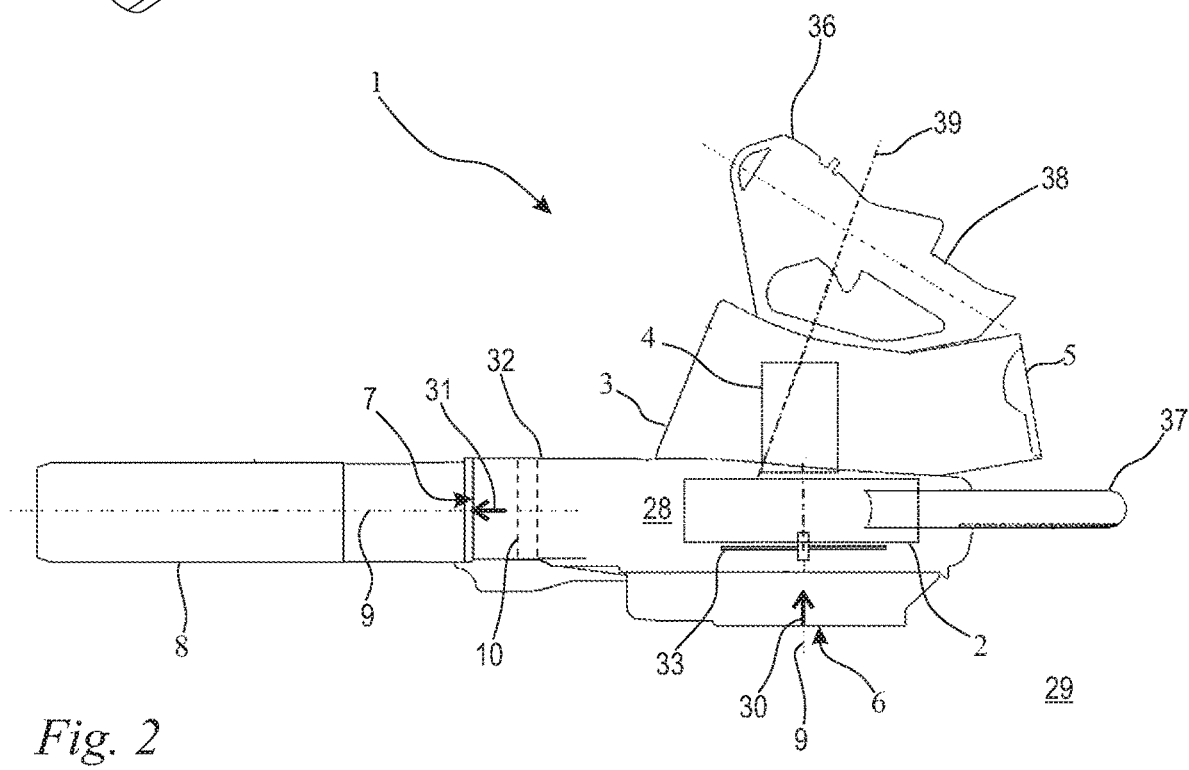
FIG. 2 is a schematic side view of the hand-guided power tool with intake grids at the intake and blow openings.

FIG. 2 shows in a schematic illustration the power tool 1 that comprises a housing 3, wherein the housing 3 encloses a drive motor 4 and a blower device 2. The drive motor 4 drives in rotation a fan wheel which is arranged in the blower device 2 and is not illustrated in detail. In the embodiment, the drive motor 4 is an electric motor. The electric motor is supplied with power in particular by battery pack 5. The battery pack 5 is inserted in a battery pack compartment which is open toward the outer side of the housing so that the battery pack 5 can be exchanged easily without having to open the housing 3. However, the electric motor can be supplied also by electric lines with power. It can also be provided that the blower device 2 is driven by an internal combustion engine, in particular by a two-stroke engine or a mixture-lubricated four-stroke engine.

As illustrated in FIG. 2, in operation of the power tool 1 the blower device 2 sucks in air through an intake opening 6 and blows the air out through blow opening 7. In this context, an air flow 9 passes through the intake opening 6 in a first flow direction 30. The air flows in the flow direction 30 from the environment 29 of the power tool 1 into an interior 28 of the housing 3 toward the blower device 2. In the embodiment, the blower device 2 is designed as a radial blower device. The air flow 9 is thus deflected by the blower device 2 from the intake opening 6 via a blower spiral 42 toward the blow opening 7. The air flow 9 exits the interior 28 of the housing 3 through the blow opening 7 in a second flow direction 31. The first flow direction 30 and the second flow direction 31 are oriented transversely to each other.

Figure 3:
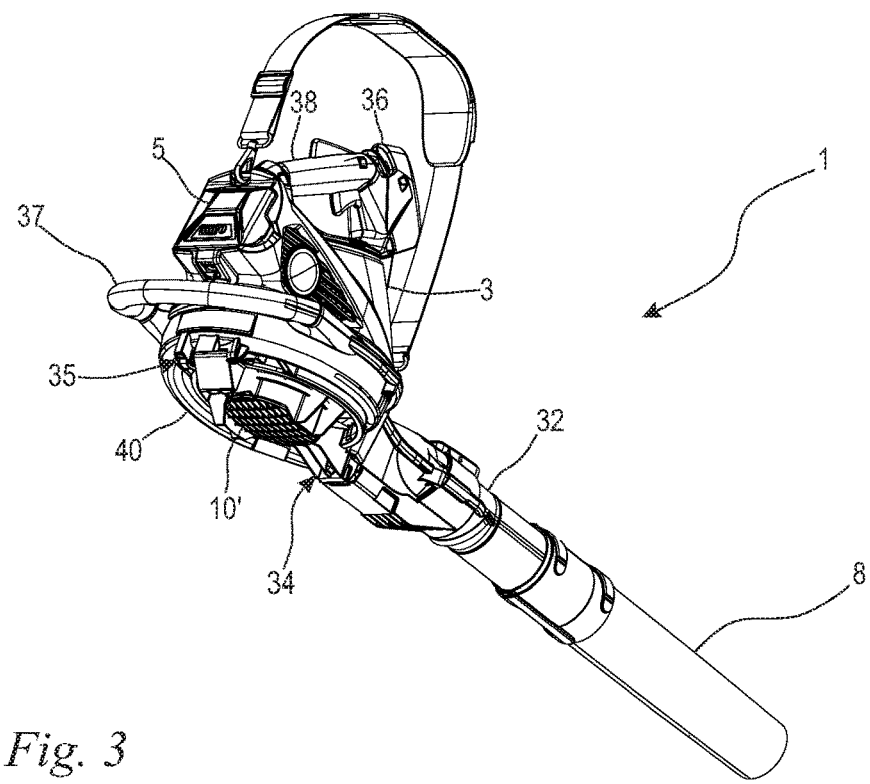
FIG. 3 is a perspective illustration of the hand-guided power tool according to FIG. 1 in a rear view.

As illustrated in FIGS. 1 to 3, the power tool 1 comprises a handle 36. The handle 36 is supported on the housing 3. The handle 36 comprises a grip region 38 for gripping the handle 36. The handle 36 is supported pivotably about pivot axis 39 at the power tool 1 and comprises a respective work position for vacuum mode and blower mode. Upon conversion of the power tool 1 from one operating mode into the other operating mode, the handle 36 is to be rotated, preferably by 180°, about its pivot axis 39 in order to provide the operator with an ergonomic handle position of the respective power tool 1 in the respective operating mode.

As illustrated in FIGS. 1 and 3, the power tool 1 comprises a further arc-shaped handle 37 in addition to the handle 36. The arc-shaped handle 37 and the blow opening 7 are arranged on opposite sides of the blower device 2. In this way, the repulsion force of the air flow 9 exiting from the blower tube 8 can be absorbed very well by the operator by means of the handle 37. The arc-shaped handle 37 is embodied substantially in a U shape. The two ends of the handle 37 are secured at opposite sides of the power tool 1 such that the handle 37 engages across the blower device 2.

Figure 4:
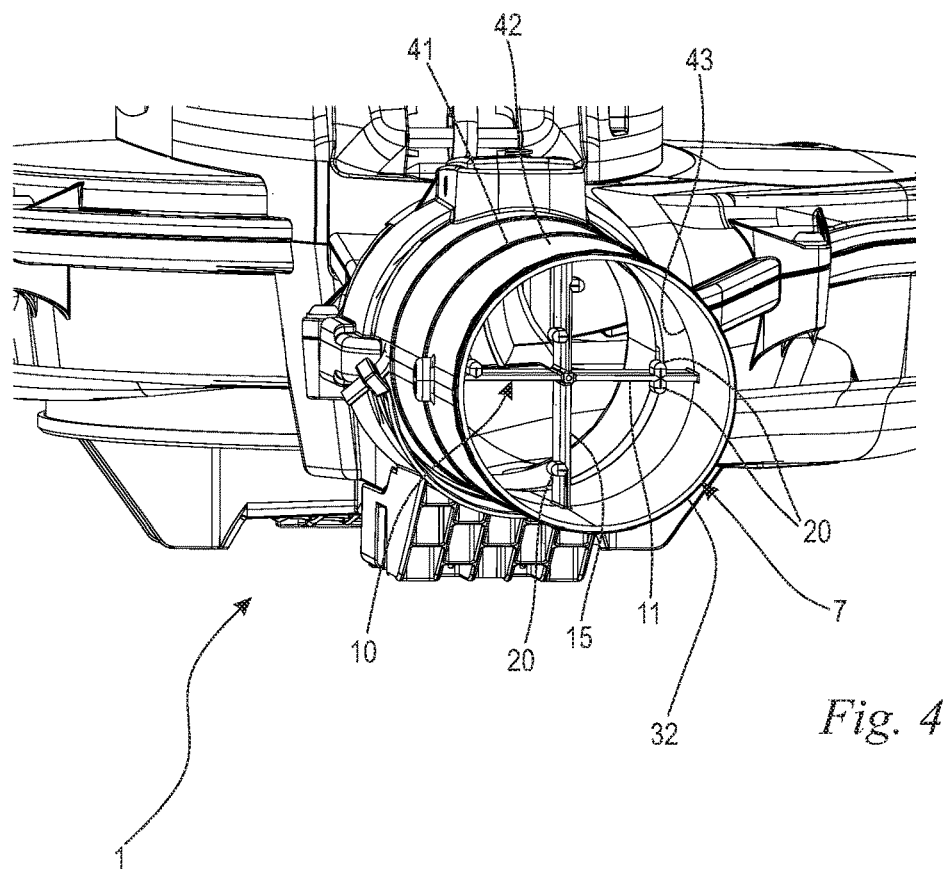
FIG. 4 is a perspective detail illustration of the power tool according to FIG. 1 in demounted state with guard at the blow opening.

FIGS. 1 to 3, show the power tool 1 mounted as a blower. The blow opening 7 is provided at an assembly socket 32 which is part of the housing 3. In the blower mode of the power tool 1, the blower tube 8 is arranged at the assembly socket 32. Inside of the assembly socket 32, a first guard 10 is provided (FIG. 4). The first guard 10 is indicated schematically in FIG. 2. The first guard 10 is formed as an ingress protection and prevents the operator of the power tool 12 from putting his hand through the blow opening 7 at the assembly socket 32 into the interior 28 of the power tool 1.

As illustrated in FIGS. 1 to 3, a second guard 10' is provided at the intake opening 6 in the blower mode of the power tool 1. The second guard 10' is designed as a grid so that larger objects are blocked by the grid and cannot be sucked into the blower device 2. In addition, the second guard 10' also provides an ingress protection. This is in particular important when a shredder 33 for shredding leaves is provided at the blower device 2, as schematically indicated in FIG. 2. In the blower mode of the power tool 1, the air flow 9 flows from the environment 29 through the second guard 10' via the intake opening 6 into the blower device 2. Subsequently, the air flows through the blow opening 7 into the blower tube 8 and from there into the environment 29.

In the suction or vacuum mode, not illustrated in detail, of the power tool 1, a collecting bag, for example, can be mounted on the assembly socket 32 at the blow opening 7 in place of the blower pipe 8. In addition, at the intake opening 6 a suction tube is arranged. As illustrated in FIGS. 1 and 2, the second guard 10' is fastened pivotably by means of a closure 34 and a hinge 35 at the housing 3 of the power tool 1. For conversion of the power tool 1 from blower mode into vacuum mode, the closure 34 of the second guard 10' is to be opened. Subsequently, the second guard 10' can be pivoted into an open position and the suction tube can be pushed onto the intake opening 6. In the vacuum mode of the power tool 1, the air flow 9 flows through the suction tube and from there through the intake opening 6 to the blower device 2. The air flow 9 exits the blower device 2 in flow direction 31 and flows through the blow opening 7 into the collecting bag. By means of the air flow 9 generated by the blower device 2, objects such as leaves can be sucked in. As illustrated in the embodiment, it can be provided that a shredder 33 is disposed at the blower device 2 which shreds these objects so that the shredded objects can be collected in the collecting bag in compact form.

Figure 5:
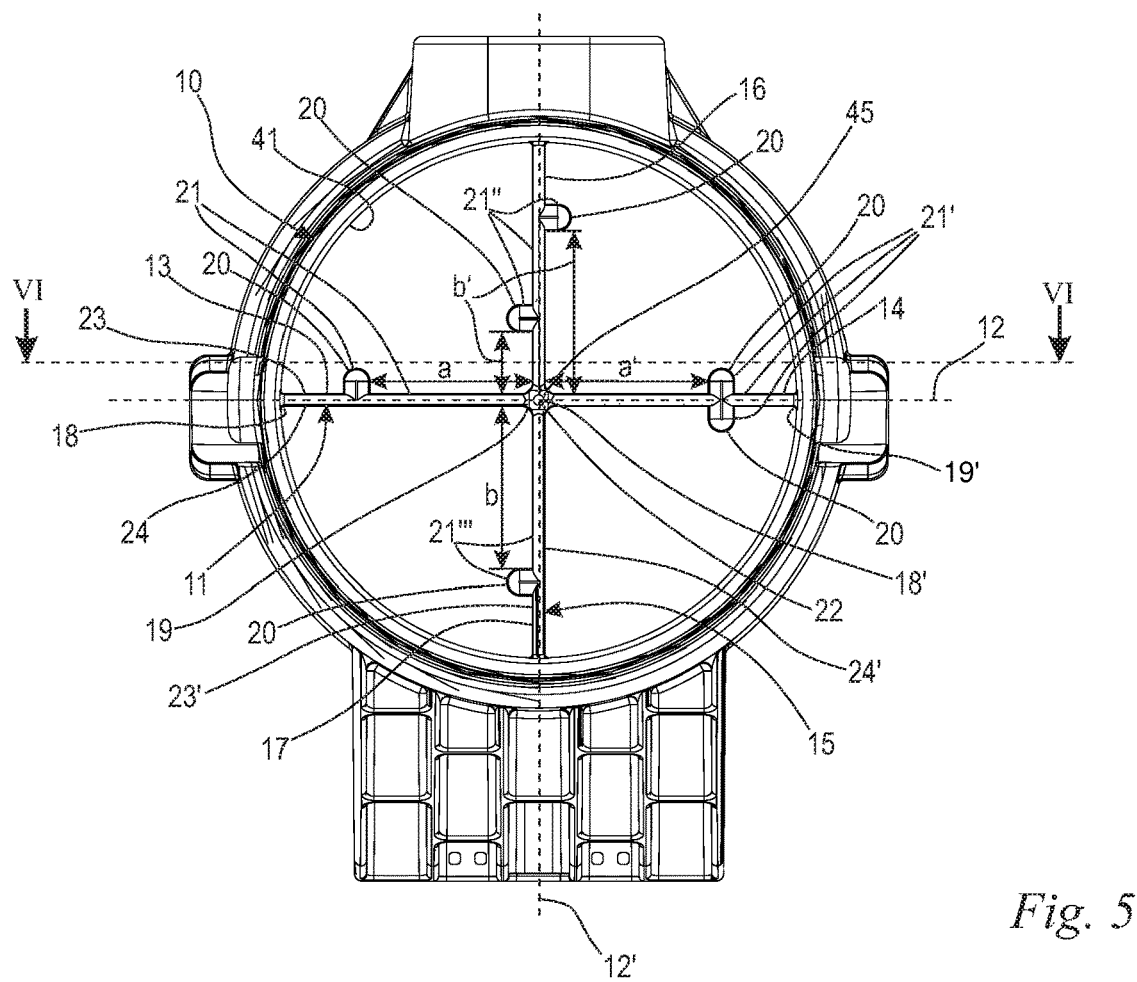
FIG. 5 is a front view of the guard at the blow opening of the power tool according to FIG. 1.

FIG. 4 shows a detail of the power tool 1 in demounted state. The blower tube 8 is detached from the assembly socket 32. Thus, the blow opening 7 at the assembly socket 32 is visible. The assembly socket 32 is of a tubular configuration. In the embodiment, the cross section of the assembly socket 32 is circular (FIG. 5). It can also be expedient to design the cross section in a different shape, for example, oval, rectangular etc. The assembly socket 32 comprises a circumferential wall 41 with an outer surface 42 facing the environment 29 and with an inner surface 43 facing away from the outer surface 42. The first guard 10 is arranged in the assembly socket 32. The first guard 10 is designed such that it is not possible for the operator to pass his hand through the assembly socket 32.

As illustrated in FIG. 4, the first guard 10 in the embodiment comprises two ribs 11, 15, namely a rib 11 and a further rib 15. The ends of the two ribs 11, 15 are attached to the inner surface 42 of the circumferential wall 41 of the assembly socket 32, respectively. In the viewing direction coaxial to the assembly socket 32, the ribs 11, 15 are designed, preferably in a straight line and form chords of the circular cross section of the assembly socket 32 (FIG. 5). In an alternative embodiment of the first guard 10, the ribs 11, 15 can also be arc-shaped. In the embodiment, the two ribs 11, 15 each have a longitudinal direction 12, 12' (FIG. 5), wherein the longitudinal direction 12 of one rib 11 is different from the longitudinal direction 12' of the additional rib 15. The two ribs 11, 15 converge at a connection point 22 so that their longitudinal directions 12, 12' at the connection point 22 intercept each other. Thus, the two ribs 11, 15 provide a protection grid. It can also be expedient to arrange the two ribs 11, 15 in such a way in the assembly socket 32 that they do not contact each other.

As illustrated in FIG. 5, the longitudinal direction 12' of the additional rib 15 extends transversely, in particular orthogonally to the longitudinal direction 12 of the rib 11. The connection point 22 of the two ribs 11, 15 is positioned preferably approximately at the center of the cross section of the assembly socket 32. Of course, the first guard 10 can also be comprised of only one single rib 11. When the single rib 11 extends approximately through the center 45 of the cross section of the assembly socket 32, the operator will also be prevented by the single rib 11 from passing his hand through the assembly socket 32 into the interior 28 of the power tool 1. In addition, it is of course also understood that the first guard 10 can be comprised of more than two ribs 11, 15.

As illustrated in FIG. 5, the rib 11 comprises at least one rib section 13, 14. In the preferred embodiment, the rib 11 comprises two rib sections 13, 14, namely a first rib section 13 and a second rib section 14. It can also be expedient to provide more than two rib sections 13, 14. A rib section 13, 14 extends along the longitudinal direction 12 of the rib 11 from a first end 18 to a second end 19. In the embodiment, the first end 18 of the first rib section 13 is positioned at the circumferential wall 41, the second end 19 of the first rib section 13 is positioned at the connection point 22 of the two ribs 11, 15. In the embodiment, the first end 18' of the second rib section 14 is positioned at the connection point 22 of the two ribs 11, 15, the second end 19' of the second rib section 14 is positioned at the circumferential wall 41. A rib section 13, 14, depending on the outer excitation, can be excited to vibrate at its inherent modes, wherein the ends 18, 18', 19, 19' of the rib sections 13, 14 form the mount points of a vibrating rib section 13, 14. Each rib section 13, 14 comprises, considered by itself, its own inherent frequencies.

As illustrated in FIG. 5, on at least one rib section 13, 14 of the first guard 10 a disruptive body 20 that can translatorily vibrate is arranged. A disruptive body 20 that can translatorily vibrate is to be understood as a disruptive body which can at least vibrate translatorily. It is also possible that the disruptive body that can translatorily vibrate can also vibrate rotatorily in addition. A connection point 22 of two ribs 11, 15, on the other hand, constitutes no disruptive body 20 because the ribs 11, 15 reinforce each other in such a way that a translatory vibration of the connection point 22 in the meaning of this application is not possible. A rotatory vibration of the connection points 22 is however possible. The disruptive body 20 forms together with the at least one rib section 13, 14 a vibration system 21 with a system inherent frequency, wherein the system inherent frequency and the inherent frequency of the rib sections 13, 14 are different. The first guard 10 is arranged in the assembly socket 32 so that the air flow 9 passes at higher flow rate through the first guard 10. The air flow 9 provides an external excitation of the vibration-capable rib sections 13, 14. Due to the disruptive bodies 20, a vibration system 21 is created whose system inherent frequencies are different compared to the excitation frequency of the external excitation. Thus, resonances at the rib sections 13, 14 that lead to a high noise level are avoided. Therefore, a disruptive body 20 causes a frequency shift.

As illustrated in FIG. 5, the additional rib 15 is also divided by the connection point 22 into two rib sections 16, 17, namely a top rib section 16 and a bottom rib section 17. Thus, four rib sections 13, 14, 16, 17 are provided in the embodiment, wherein at each rib section 13, 14, 16, 17 at least one disruptive body 20 is arranged. In an alternative embodiment, it can be expedient to provide disruptive bodies 20 only at one, preferably only at two, in particular only at three, of the rib sections 13, 14, 16, 17.

As illustrated in FIG. 5, only one disruptive body 20 is provided at the first rib section 13 of the rib 11 and only two disruptive bodies 20 are provided at the second rib section 14 of the rib 11 in the embodiment. In this way, the mass of the vibration system 21 comprised of the first rib section 13 and one disruptive body 20 is different compared to the vibration system 21' comprised of the second rib section 14 and two disruptive bodies 20. The connection point 22 is fixed translatorily but forms a coupling point of the two vibration systems 21, 21' which transmits rotatory vibrations. Due to the different masses of the two vibration systems 21, 21', the two vibration systems 21, 21' act on each other in a vibration-reducing manner.

As illustrated in FIG. 5, only one disruptive body 20 is arranged at the bottom rib section 17 of the additional rib 15. At the top rib section 16 of the additional rib 15, on the other hand, only two disruptive bodies 20 are arranged so that the masses of the two vibration systems 21", 21'" are different. Thus, in analogy to the above explanation, a vibration-reducing effect occurs also. In the preferred embodiment, the rib sections 13, 14, 16, 17 of a rib 11, 15 each comprise a different number of disruptive bodies 20. In this way, the masses of the vibration systems 21, 21', 21", 21'" of a rib 11, 15 are different.

It can also be provided that the disruptive bodies 20 of a rib 11, 15 have masses of different magnitude. In this way, the vibration systems 21, 21', 21", 21'" of a rib 11, 15 can be provided with masses of different magnitude even for the same number of disruptive bodies 20. Of course, the number of disruptive bodies 20 on the respective rib sections 13, 14, 16, 17 of a rib 11, 15 as well as the mass of the individual disruptive bodies 20 on the rib sections 13, 14, 16, 17 of a rib 11, 15 can be different.

As illustrated in FIG. 5, a disruptive body 20 is designed as an elevation on a rib section 13, 14, 16, 17. The ribs 11, 15 have, considered by themselves, a rib cross section that is preferably constant along their longitudinal direction 12. Thus, an elevation that is projecting past the constant rib cross section is to be understood preferably as a disruptive body 20. The disruptive body 20 is preferably embodied as an elongate, in particular rod-shaped, elevation on the rib section 13, 14, 16, 17.

Figure 6:
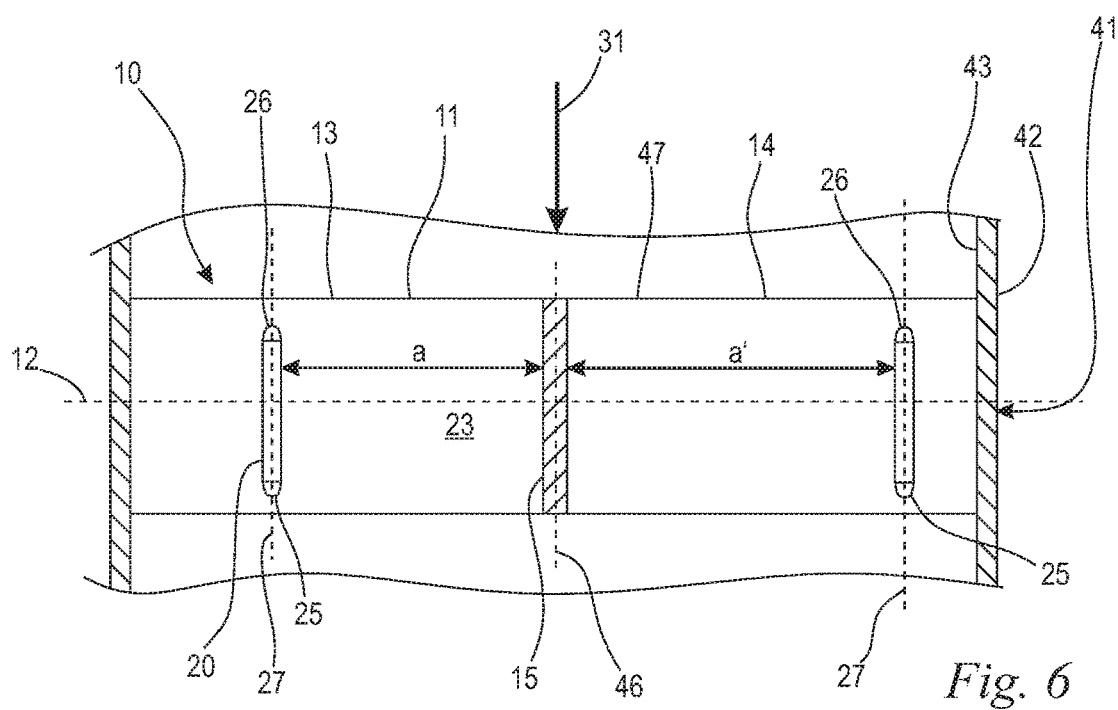
FIG. 6 is a schematic section illustration of the guard along the arrows VI of FIG. 5.

As illustrated in FIG. 6, the disruptive body 20 extends from its first longitudinal end 25 to its second longitudinal end 26 along a length direction 27. The disruptive bodies 20 are preferably arranged such on the rib sections 13, 14, 16, 17 that the length direction 27 of the disruptive body 20 is oriented approximately parallel to the flow direction 31 of the air flow 9. Accordingly, the flow resistance of the disruptive body 20 is minimal. In order to further reduce the flow resistance of the disruptive body 20, the longitudinal ends 25, 26 of the disruptive body 20 are rounded aerodynamically, in particular in a drop shape.

In order to be able to modify the mass of the disruptive body 20, the disruptive bodies 20 can be designed differently with regard to their geometry. Thus, it can be advantageous that the disruptive bodies 20 have different lengths in the length direction 27 of the disruptive bodies 20 and different widths. It can also be provided that the disruptive bodies 20 are comprised of different materials and thus also have different masses. In a preferred embodiment, the disruptive bodies 20 are however embodied of the same material, in particular of plastic material, as the ribs 11, 15 so that the guard 10 can be manufactured in a simple manner. The guard 10 is preferably embodied as an injection-molded part. The disruptive body 20 and the rib 11 are preferably formed as one piece. Preferably, the guard 10 is of an one-piece configuration. The mass of the disruptive body 20 corresponds at least to 2%, in particular at least to 5%, preferably to approximately 8%, of the mass of a rib 11, 15. Preferably, the arrangement of a disruptive body 20 on a rib section 13, 14, 16, 17 of a rib 11, 15 effects an inherent frequency shift of at least 2%, preferably of at least 5%, advantageously of approximately 10%, in relation to the first harmonic and second harmonic of the respective rib section 13, 14, 16, 17.

In principle, the disruptive bodies 20 on the individual rib sections 13, 14, 16, 17 are to be selected in regard to number and position in such a way that the inherent frequencies of the vibration systems 21, 21', 21", 21'" are modified such that they do not create resonances with the excitation frequencies of the air flow 9. In this context, it has been found to be advantageous that the vibration systems 21, 21', 21", 21'" of neighboring rib sections 13, 14, 16, 17 preferably have different masses or/and different relative centers of mass. In this way, a common vibration across the connection point 22 is prevented.

As shown in FIG. 5, the two ribs 11, 15 each have a top side 23, 23' and a bottom side 24, 24' opposite the top side 23, 23'. In the embodiment, at least one disruptive body 20 is arranged on the top side 23, 23' and at least one disruptive body 20 on the bottom side 24, 24' of the two ribs 11, 15. At the first rib section 13 of the rib 11, a disruptive body 20 is arranged on the top side 23 of the rib 11. At the second rib section 14 of the rib 11, a disruptive body 20 is arranged on the bottom side 24 of the rib 11; preferably, an additional disruptive body 20 is also arranged on the top side 23 of the rib 11. In addition, at the bottom rib section 16 of the additional rib 15, a disruptive body 20 is arranged on the top side 23' of the additional rib 15. At the top rib section 17, a disruptive body 20 is arranged on the bottom side 24' of the additional rib 15; preferably, a disruptive body 20 is additionally arranged on the top side 23' of the additional rib 15. Accordingly, in the embodiment, the number of disruptive bodies 20 on the neighboring rib sections 13, 14 of a rib 11 or on the neighboring rib sections 16, 17 of a rib 15 is preferably different. Moreover, it is advantageous to arrange the disruptive bodies 20 of two neighboring rib sections 13, 14 or of two neighboring rib sections 16, 17 also on different sides 23, 24 or 23', 24' of the rib 11 or 15.

As illustrated in FIGS. 5 and 6, the disruptive bodies 20 of neighboring rib sections 13, 14 of a rib 11 or neighboring rib sections 16, 17 of a rib 15 in the embodiment are arranged asymmetrically to each other in relation to a plane 46 (FIG. 6) which is oriented orthogonally to the respective rib 11 or 15 and intercepts the connection point 22. The plane 46 extends parallel to the length direction 27 of the disruptive bodies 20. In other words, the distances a, a'; b, b' (FIG. 5) measured in longitudinal direction of the respective rib 11, 15 of two disruptive bodies 20 which are arranged on neighboring rib sections 13, 14, 16, 17 are different.

As shown in FIG. 6 based on the example of rib 11, the disruptive body 20 in the preferred embodiment is arranged such on the rib section 13, 14 or 16, 17 that, in the viewing direction perpendicularly to the top side 23 or 23' of the rib 11 or 15, the disruptive body 20 is arranged inside of the rib 11 of 15. Accordingly, the disruptive body 20 does not project past the rib 11, 15. In an alternative embodiment, it can also be expedient to design the disruptive body 20 such on the rib 11, 15 that the disruptive body 20 projects past the rib 11, 15.

Figure 7:
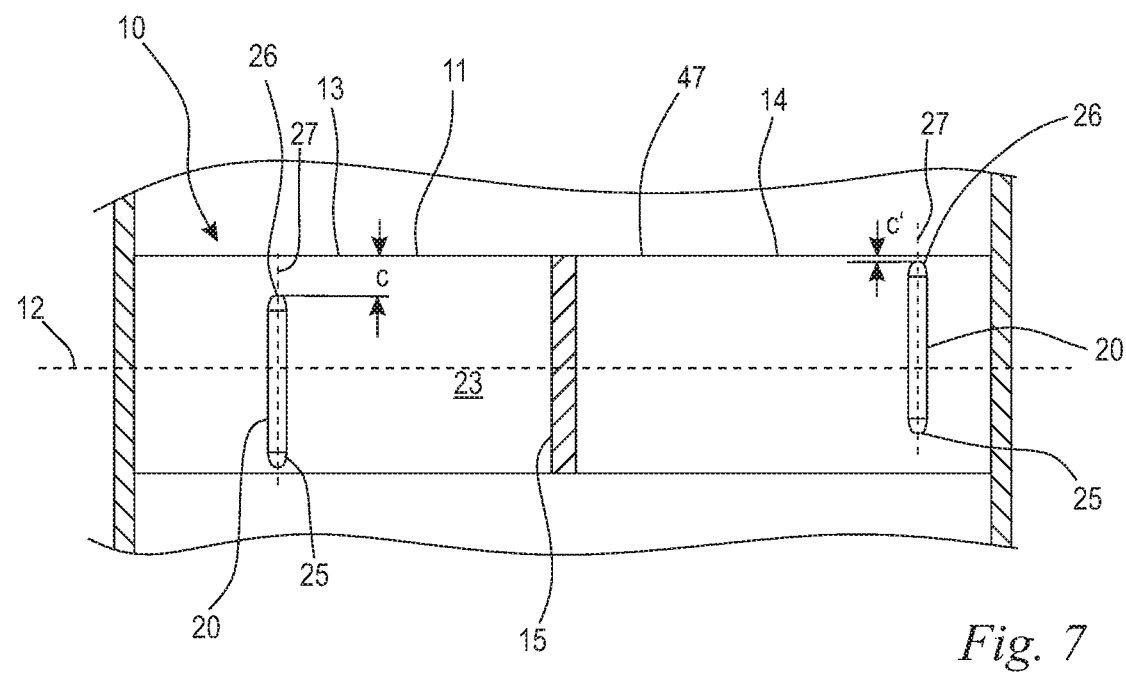
FIG. 7 is a schematic section illustration of the guard along the arrows VI of FIG. 5 showing an alternative embodiment.

As illustrated in FIG. 7, the disruptive bodies 20 can also be positioned differently with respect to their length direction 27. The ribs 11, 15 have a flow edge 47 facing the air flow 9. The flow edge 47 extends in the preferred embodiment parallel to the longitudinal direction 12 of a rib 11 or 15. The disruptive bodies 20 comprises a distance c, c' in relation to the flow edge 47. The distances c, c' of two disruptive bodies 20 that are arranged on neighboring rib sections 13, 14 or neighboring rib sections 16, 17 of a rib 11 or 15 are different in the preferred embodiments.

Figure 8:
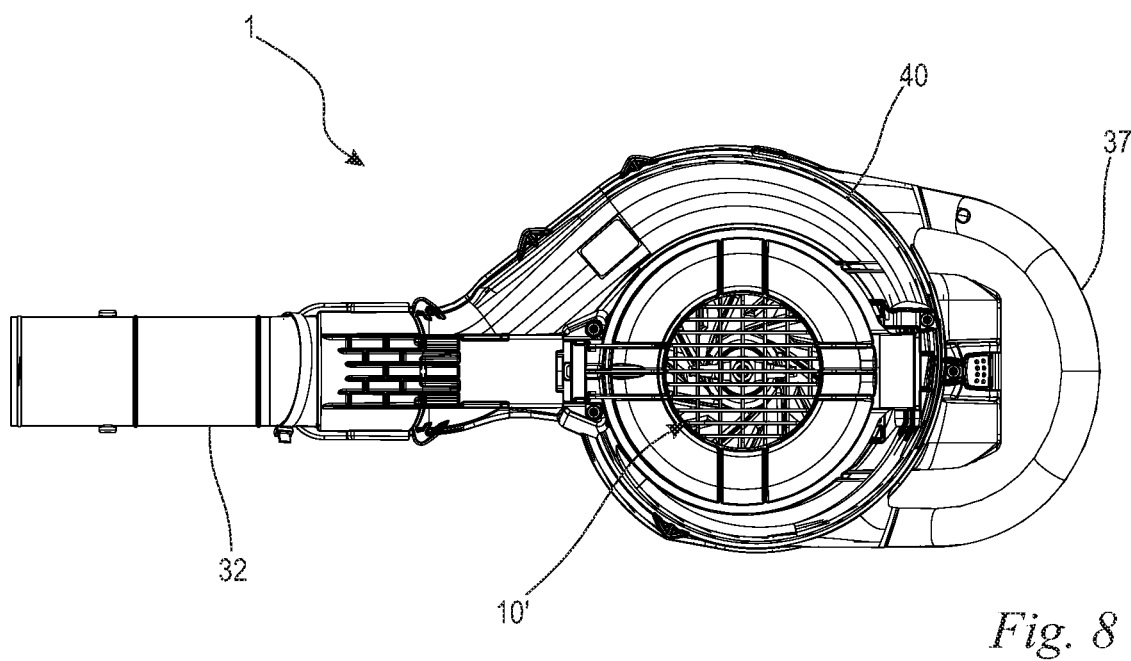
FIG. 8 is an illustration of the bottom of the power tool according to FIG. 1 with guard at the intake opening.
Figure 9:
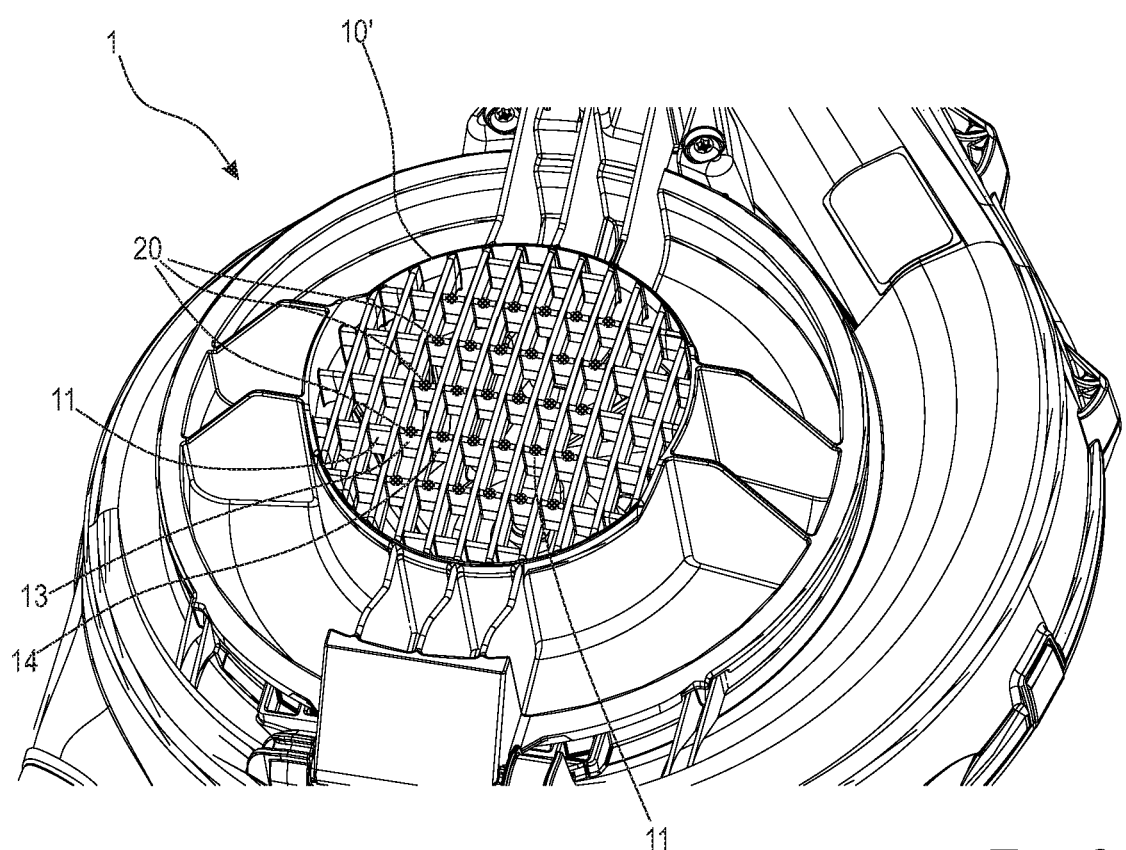
FIG. 9 shows in a perspective illustration the guard at the intake opening of the power tool according to FIG. 1.

In FIG. 8, the power tool 1 is illustrated in a bottom view. In this view, the second guard 10' can be seen. The second guard 10' is designed as an intake grid and is significantly more fine-meshed than the first guard 10. The fine-mesh guard 10' can also cause increased noise emissions due to occurring resonance vibrations. As indicated schematically in FIG. 9, the rib sections of the ribs can also be provided with disruptive bodies 20. In regard to the number and position of disruptive bodies 20 on the rib sections, the same principles as explained with respect to the first guard 10 apply and are also transferable onto the second guard 10'. In principle, at each guard, in particular at each guard of a power tool 1 at which air flows effect a separate excitation and cause individual ribs or rib sections to vibrate, corresponding disruptive bodies 20 can be provided. This applies in particular also to cooling air grids for a cooling air flow for a drive motor 4.

The specification incorporates by reference the entire disclosure of European priority document 21 156 954.6 having a filing date of Feb. 12, 2021.

While specific embodiments of the invention have been shown and described in detail to illustrate the inventive principles, it will be understood that the invention may be embodied otherwise without departing from such principles.

What is claimed is:

1. A guard for an intake channel or blow channel of a power tool, the guard comprising:
    a first rib comprising a longitudinal direction, wherein the first rib comprises a first rib section, wherein the first rib section extends along the longitudinal direction of the first rib from a first end of the first rib section to a second end of the first rib section, wherein the first rib section, considered by itself, comprises an inherent frequency;
    one or more first disruptive bodies arranged on the first rib section between the first end of the first rib section and the second end of the first rib section, wherein the one or more first disruptive bodies are configured to translatorily vibrate together with the first rib section;
    wherein the first rib section and the one or more first disruptive bodies form a vibration system with a system inherent frequency, wherein the inherent frequency of the first rib section is different from the system inherent frequency.

2. The guard according to claim 1, wherein the guard is embodied as a guard grid and comprises a second rib, wherein the first rib and the second rib intersect each other at a connection point.

3. The guard according to claim 2, wherein the second rib is oriented transversely to the first rib.

4. The guard according to claim 2, wherein the second rib is oriented orthogonally to the first rib.

5. The guard according to claim 2, wherein the first rib is divided at the connection point into the first rib section and into a second rib section, wherein the second rib is divided at the connection point into a top rib section and into a bottom rib section.

6. The guard according to claim 5, wherein one or more of the rib sections selected from the group consisting of the second rib section, the top rib section, and the bottom rib section each comprise one or more second disruptive bodies, respectively.

7. The guard according to claim 6, wherein the one or more first disruptive bodies and the one or more second disruptive bodies comprise different masses, respectively.

8. The guard according to claim 6, wherein a mass of the one or more second disruptive bodies connected to the second rib section amounts to at least 2% of a mass of the first rib.

9. The guard according to claim 6, wherein a mass of the one or more second disruptive bodies connected to the bottom rib section or to the top rib section amounts to at least 2% of a mass of the second rib.

10. The guard according to claim 6, wherein the one or more second disruptive bodies extend in a length direction and are rounded aerodynamically.

11. The guard according to claim 6, wherein the one or more second disruptive bodies and the first rib or the second rib, respectively, are configured together as one piece.

12. The guard according to claim 6, wherein the one or more second disruptive bodies and the first rib or the second rib, respectively, are comprised of the same material.

13. The guard according to claim 6, wherein the second rib section comprises one or more of the second disruptive bodies.

14. The guard according to claim 13, wherein a number of the one or more first disruptive bodies of the first rib section is different from a number of the one or more second disruptive bodies of the second rib section.

15. The guard according to claim 13, wherein the one or more first disruptive bodies of the first rib section and the one or more second disruptive bodies of the second rib section are arranged asymmetrically to each other in relation to a plane extending through the connection point and arranged orthogonally to the first rib.

16. The guard according to claim 13, wherein the first rib comprises a top side and a bottom side, wherein the one or more first disruptive bodies of the first rib section are arranged on the top side of the first rib and the one or more second disruptive bodies of the second rib section are arranged on the bottom side of the first rib.

17. The guard according to claim 16, wherein the one or more first disruptive bodies and the one or more second disruptive bodies of the second rib section are arranged within the first rib in a viewing direction onto the top side of the first rib.

18. The guard according to claim 6, wherein the top rib section and the bottom rib section each comprises one or more of the second disruptive bodies.

19. The guard according to claim 18, wherein a number of the one or more second disruptive bodies of the top rib section is different form a number of the one or more second disruptive bodies of the bottom rib section.

20. The guard according to claim 18, wherein the one or more second disruptive bodies of the bottom rib section and the one or more second disruptive bodies of the top rib section are arranged asymmetrically to each other in relation to a plane extending through the connection point and arranged orthogonally to the second rib.

21. The guard according to claim 18, wherein the second rib comprises a top side and a bottom side, wherein the one or more second disruptive bodies of the bottom rib section are arranged on the top side of the second rib and the one or more second disruptive bodies of the top rib section are arranged on the bottom side of the second rib, or the one or more second disruptive bodies of the top rib section are arranged on the top side of the second rib and the one or more second disruptive bodies of the bottom rib section are arranged on the bottom side of the second rib.

22. The guard according to claim 21, wherein the one or more second disruptive bodies of the bottom rib section and the one or more second disruptive bodies of the top rib section are arranged within the second rib in a viewing direction onto the top side of the second rib.

23. The guard according to claim 1, wherein a mass of the one or more first disruptive bodies amounts to at least 2% of a mass of the first rib.

24. The guard according to claim 1, wherein the one or more first disruptive bodies extend in a length direction and are rounded aerodynamically.

25. The guard according to claim 1, wherein the one or more first disruptive bodies and the first rib are configured together as one piece.

26. The guard according to claim 1, wherein the one or more first disruptive bodies and the first rib are comprised of the same material.

27. A power tool comprising a guard according to claim 1.

* * * * *